(12) United States Patent
Bargnesi et al.

(10) Patent No.: US 11,528,294 B2
(45) Date of Patent: Dec. 13, 2022

(54) SYSTEMS AND METHODS FOR AUTOMATED THREAT DETECTION

(71) Applicant: Secureworks Corp., Wilmington, DE (US)

(72) Inventors: Nicholas Bargnesi, Scituate, RI (US); Steven Versteeg, Ivanhoe (AU); Li Sun, Beaumaris (AU)

(73) Assignee: SecureworksCorp., Wilmington, DE (US)

( * ) Notice: Subject to any disclaimer, the term of this patent is extended or adjusted under 35 U.S.C. 154(b) by 0 days.

(21) Appl. No.: 17/178,386

(22) Filed: Feb. 18, 2021

(65) Prior Publication Data

US 2022/0263858 A1    Aug. 18, 2022

(51) Int. Cl.
*H04L 9/40* (2022.01)
*G06K 9/62* (2022.01)

(52) U.S. Cl.
CPC .......... *H04L 63/1441* (2013.01); *G06K 9/623* (2013.01); *H04L 63/0263* (2013.01); *H04L 63/1433* (2013.01)

(58) Field of Classification Search
CPC ............. H04L 63/1441; H04L 63/0263; H04L 63/1433

(Continued)

(56) References Cited

U.S. PATENT DOCUMENTS 5,937,066 A   8/1999   Gennaro et al.
6,357,010 B1  3/2002   Viets et al.

(Continued)

FOREIGN PATENT DOCUMENTS

EP    3599753 A1   1/2020
RU    2738344 C1   12/2020

(Continued)

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

(Continued)

*Primary Examiner* — Teshome Hailu
(74) *Attorney, Agent, or Firm* — Womble Bond Dickinson (US) LLP (57) ABSTRACT

Systems and methods for dynamically training a threat detection system include monitoring security analyst workflow data from security analysts analyzing scans of security logs. The workflow data includes rules applied to security log scan results, rule results selected for further analysis, tags applied to rule results, filters applied to rule results, rankings applied to rule results, or actions associated with a pivot by security analysts. A tagging classifier is then trained based on tags assigned to scan results. A review classifier is trained based on scan results previously reviewed by security analysts. A filter and ranking method is trained based on filters and rankings applied to the scan results. An automated threat hunting playbook is generated including the tagging classifier, the review classifier, and the filter and ranking method. The automated threat hunting playbook generates one or more scripts to automatically analyze incoming security data.

23 Claims, 5 Drawing Sheets

(58) Field of Classification Search
USPC .......................................................... 726/23
See application file for complete search history.

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,492,957 B1 | 2/2009 | Bonhaus |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 7,926,113 B1* | 4/2011 | Gula .................. H04L 63/1425 726/25 |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,793,786 B2* | 7/2014 | Bhesania ................ G06F 21/74 713/189 |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,191,400 B1 | 11/2015 | Ptasinski et al. |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,712,549 B2 | 7/2017 | Almurayh |
| 9,742,559 B2 | 8/2017 | Christodorescu et al. |
| 9,767,302 B2 | 9/2017 | Lim |
| 9,805,202 B2 | 10/2017 | Medeiros et al. |
| 9,910,986 B1 | 3/2018 | Saxe |
| 9,973,524 B2 | 5/2018 | Boyer et al. |
| 10,050,992 B2 | 8/2018 | Thyni et al. |
| 10,063,582 B1* | 8/2018 | Feng .................... G06F 21/575 |
| 10,116,500 B1 | 10/2018 | Long et al. |
| 10,311,231 B1 | 6/2019 | Kayyoor et al. |
| 10,356,125 B2 | 7/2019 | Goutal et al. |
| 10,382,489 B2 | 8/2019 | Das et al. |
| 10,419,903 B2 | 9/2019 | Singh et al. |
| 10,425,223 B2 | 9/2019 | Roth et al. |
| 10,474,820 B2 | 11/2019 | Manadhata |
| 10,491,632 B1 | 11/2019 | Natarajan et al. |
| 10,567,407 B2 | 2/2020 | Tang et al. |
| 10,594,713 B2 | 3/2020 | McLean |
| 10,601,865 B1 | 3/2020 | Mesdaq et al. |
| 10,728,263 B1 | 7/2020 | Neumann |
| 10,735,470 B2 | 8/2020 | Vidas et al. |
| 10,762,206 B2 | 9/2020 | Titonis et al. |
| 10,785,238 B2 | 9/2020 | McLean et al. |
| 10,834,128 B1 | 11/2020 | Rajogopalan et al. |
| 10,841,337 B2 | 11/2020 | Kinder |
| 10,853,431 B1 | 12/2020 | Lin et al. |
| 10,915,828 B2 | 2/2021 | Qhi |
| 11,165,862 B2 | 11/2021 | Austin et al. |
| 11,275,831 B1 | 3/2022 | Aouad et al. |
| 2002/0129135 A1 | 9/2002 | Delany et al. |
| 2005/0060295 A1* | 3/2005 | Gould ................ H04L 63/1425 |
| 2005/0138204 A1 | 6/2005 | Iyer et al. |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0192867 A1* | 8/2007 | Miliefsky ............. G06F 21/577 726/25 |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1* | 9/2010 | Wei ..................... H04L 67/1002 726/1 |
| 2011/0004771 A1 | 1/2011 | Matsushima et al. |
| 2011/0179492 A1 | 7/2011 | Markopoulou et al. |
| 2011/0276604 A1 | 11/2011 | Hom et al. |
| 2011/0276716 A1 | 11/2011 | Coulson |
| 2012/0072983 A1 | 3/2012 | McCusker et al. |
| 2012/0117640 A1 | 5/2012 | Ramsey et al. |
| 2012/0185275 A1 | 7/2012 | Loghmani |
| 2012/0024673 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta et al. |
| 2014/0222712 A1 | 8/2014 | Samaha et al. |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0324457 A1 | 11/2015 | McLean |

(56) References Cited

U.S. PATENT DOCUMENTS

| | | |
|---|---|---|
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0139886 A1 | 5/2016 | Perdriau et al. |
| 2016/0156655 A1 | 6/2016 | Lotem et al. |
| 2016/0182546 A1 | 6/2016 | Coates et al. |
| 2016/0241591 A1 | 8/2016 | Ramsey et al. |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0063893 A1 | 3/2017 | Franc et al. |
| 2017/0063905 A1* | 3/2017 | Muddu ............... H05K 999/99 |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0024475 A1 | 8/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0359368 A1 | 12/2017 | Hodgman |
| 2018/0077189 A1 | 3/2018 | Doppke et al. |
| 2018/0089574 A1 | 3/2018 | Goto |
| 2018/0091306 A1 | 3/2018 | Antonopoulos et al. |
| 2018/0103010 A1* | 4/2018 | Diaz Cuellar ...... H04L 63/0263 |
| 2018/0124073 A1 | 5/2018 | Scherman et al. |
| 2018/0124085 A1 | 5/2018 | Frayman et al. |
| 2018/0152480 A1 | 5/2018 | Kinder et al. |
| 2018/0181599 A1 | 6/2018 | Crabtree et al. |
| 2018/0288198 A1 | 10/2018 | Pope et al. |
| 2018/0036755 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0068630 A1* | 2/2019 | Valecha ............. H04L 63/1408 |
| 2019/0095801 A1 | 3/2019 | Saillet et al. |
| 2019/0102554 A1 | 4/2019 | Luo et al. |
| 2019/0102646 A1 | 4/2019 | Redmon |
| 2019/0104154 A1 | 4/2019 | Kumar et al. |
| 2019/0109717 A1 | 4/2019 | Reddy et al. |
| 2019/0122258 A1 | 4/2019 | Bramberger et al. |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0173919 A1 | 6/2019 | Irimie |
| 2019/0242718 A1 | 8/2019 | Siskind et al. |
| 2019/0258807 A1 | 8/2019 | DiMaggio et al. |
| 2019/0297096 A1 | 9/2019 | Ahmed et al. |
| 2019/0342296 A1 | 11/2019 | Anandam et al. |
| 2019/0347433 A1 | 11/2019 | Chakravorty et al. |
| 2019/0377832 A1 | 12/2019 | McLean et al. |
| 2019/0379678 A1 | 12/2019 | McLean et al. |
| 2020/0036750 A1 | 1/2020 | Bahnsen |
| 2020/0036751 A1 | 1/2020 | Kohavi |
| 2020/0186544 A1 | 6/2020 | Dichiu et al. |
| 2020/0195683 A1 | 6/2020 | Kuppa et al. |
| 2020/0259791 A1 | 8/2020 | Garcia et al. |
| 2020/0274894 A1 | 8/2020 | Argoeti et al. |
| 2020/0285737 A1 | 9/2020 | Kraus et al. |
| 2020/0285952 A1 | 9/2020 | Liu et al. |
| 2020/0314122 A1 | 10/2020 | Jones et al. |
| 2020/0336497 A1 | 10/2020 | Seul et al. |
| 2020/0351285 A1 | 11/2020 | Eisenkot et al. |
| 2020/0351302 A1 | 11/2020 | Kyle |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0358819 A1 | 11/2020 | Bowditch et al. |
| 2020/0364338 A1 | 11/2020 | Ducau et al. |
| 2020/0394309 A1 | 12/2020 | Angelo et al. |
| 2021/0006575 A1 | 1/2021 | McLean et al. |
| 2021/0067562 A1 | 3/2021 | Kinder et al. |
| 2021/0109797 A1 | 4/2021 | Zhou |
| 2021/0112087 A1 | 4/2021 | Tassoumt |
| 2021/0112090 A1 | 4/2021 | Rivera et al. |
| 2021/0173930 A1 | 6/2021 | Dahal |
| 2021/0185057 A1 | 6/2021 | McLean |
| 2021/0226970 A1 | 7/2021 | Ross et al. |
| 2021/0258327 A1 | 8/2021 | Felke et al. |
| 2022/0038424 A1 | 2/2022 | Liu et al. |
| 2022/0070182 A1 | 3/2022 | Bowditch et al. |

FOREIGN PATENT DOCUMENTS

| | | |
|---|---|---|
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Secureworks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 32$^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

URLVoid; URLVoid.com; retrieved from archives.org: https:web.archive.org/web/20180730215132/https://www.urlvoid.com/); Published Jul. 30, 2018.

International Search Report and the Written Opinion of the International Search Authority for PCT/US21/63944, dated Mar. 16, 2022.

\* cited by examiner

SYSTEMS AND METHODS FOR AUTOMATED THREAT DETECTION

BACKGROUND

Identifying attack patterns and suspicious activity from malicious actors is an important aspect of computer network security. Highly trained security analysts spend many hours reviewing scans of security logs in order to identify and investigate potential compromise events. The sheer volume of security logs that could potentially be reviewed can overwhelm the resources of security analysts. As malicious actors become more sophisticated and adjust their attack strategies, it becomes more and more difficult to identify attack patterns and suspicious activity, and the limited resources of trained analysts are increasingly spread thin.

Accordingly, it can be seen that a need exists for systems and methods that can automatically detect potential compromise events and suspicious activities, as well as organize and prioritize scan results for more efficient review by security analysts.

The present disclosure is directed to the foregoing and other related, and unrelated, problems or issues in the relevant art.

SUMMARY

Briefly described, according to various aspects, the present disclosure includes systems and methods for dynamically training a security threat detection system. According to one aspect, a method for dynamically training a security threat detection system is disclosed. The method includes monitoring security analyst workflow data from one or more security analysts analyzing scans of security logs. The workflow data includes one or more rules applied to security log scan results, rule results selected for further analysis, tags applied to rule results, filters applied to rule results, rankings applied to rule results, or one or more actions associated with a pivot by the one or more security analysts, and/or combinations thereof. The method also includes training a tagging classifier based on the tags assigned to rule results from the workflow data; training a review classifier based on the rule results selected for further analysis; training a filter and ranking method based on filters and rankings applied to rule results from one or more security analysts; generating an automated threat hunting playbook including the tagging classifier, the review classifier, and the filter and ranking method; and generating one or more scripts for automatically analyzing incoming security data using the automated threat hunting playbook. In one embodiment, the method also includes training a pivot sequence model based on actions executed by one or more security analysts, and the automated threat hunting playbook also includes the pivot sequence model. In one embodiment, the tagging classifier, review classifier, filter and ranking method, and pivot sequence are each supervised machine learning models trained based on the workflow data of one or more security analysts. In one embodiment, the scripts for automatically analyzing incoming security data generate a number of tags, and each tag is an indicator of compromise within a computer network. In one embodiment, the method also includes receiving a tag update from one or more security analysts; and dynamically updating the tagging classifier based on the tag update. In one embodiment, the scripts for automatically analyzing incoming security data generate a selection of results for review. In one embodiment, the method also includes receiving analyst feedback regarding the selection of results for review; and dynamically updating the review classifier based on the analyst feedback regarding the selection of results for review. In one embodiment, the scripts for automatically analyzing incoming security data generate a selection of prioritized results. In one embodiment, the method also includes receiving analyst feedback regarding the selection of prioritized results; and dynamically updating the filter and ranking method based on the analyst feedback. In one embodiment, the scripts for automatically analyzing incoming security data generate one or more pivot chains, wherein a pivot chain is a series of rule results that trace a potential attack. In one embodiment, the method also includes receiving pivot chain feedback from one or more security analysts; and dynamically updating the pivot sequence model based on the pivot chain feedback.

According to another aspect, a dynamically trained threat detection system, includes a computing system for monitoring and storing security analyst workflow data from one or more security analysts analyzing scans of security logs. The workflow data includes rules applied to security log scan results, rule results selected for further analysis, tags applied to rule results, filters applied to rule results, rankings applied to rule results, or one or more actions associated with a pivot by the one or more security analysts, and/or combinations thereof. The system also includes a tagging classifier trained based on the tags assigned to rule results from the workflow data; a review classifier trained based on the rule results selected for further analysis; a filter and ranking method trained based on the filters and rankings applied to rule results from one or more security analysts; and an automated threat hunting playbook including the tagging classifier, the review classifier, and the filter and ranking method. The automated threat hunting playbook is configured to generate one or more scripts for automatically analyzing incoming security data. In one embodiment, the system also includes a pivot sequence model based on actions executed by one or more security analysts, wherein a pivot chain is a series of rule results that trace a potential attack, and the automated threat hunting playbook also includes the pivot sequence model. In one embodiment, the tagging classifier, review classifier, filter and ranking method, and pivot sequence are each supervised machine learning models trained based on the workflow data of one or more security analysts. In one embodiment, the pivot sequence model generates pivot chains when applied to raw scan data from a security log. In one embodiment, the tagging classifier generates tags when applied to raw scan data from a security log, each tag being an indicator of compromise within a computer network. In one embodiment, generates a selection of results for review when applied to raw scan data from a security log. In one embodiment, the filter and ranking method generate a selection of prioritized results when applied to raw scan data from a security log.

According to another aspect, a system for dynamically training a security threat detection system includes one or more processors and at least one memory having stored instruction. When executed, the instructions cause the system to monitor and record workflow data from one or more security analysts analyzing security logs within a computer network. The workflow data includes rules applied to security log scan results, rule results selected for further analysis, tags applied to rule results, filters applied to rule results, rankings applied to rule results, or one or more actions associated with a pivot by the one or more security analysts, and/or combinations thereof. The instructions also cause the system to train a tagging classifier based on the tags applied to rule results from the workflow data; train a review classifier based on the rule results selected for further analysis by one or more security analysts; train a filter and ranking method based on the filters and rankings applied to rule results from security analysts; and train a pivot sequence model based on actions executed by one or more security analysts. The tagging classifier, review classifier, filter and ranking method, and pivot sequence are each supervised machine learning models trained based on the workflow data of one or more security analysts. The instructions also cause the system to generate an automated threat hunting playbook including the tagging classifier, the review classifier, and the filter and ranking method. In one embodiment, the instructions also cause the system to analyze incoming security data using the one or more scripts to generate a number of tags, a selection of results for review, a selection of prioritized results, and one or more pivot chains. Each tag is an indicator of compromise within a computer network, and a pivot chain is a series of rule results that trace a potential attack. The instructions also cause the system to receive analyst feedback regarding the tags, the selection of results for review, the selection of prioritized results, and the one or more pivot chains; and dynamically update the tagging classifier, review classifier, filter and ranking method, and pivot sequence model based on the analyst feedback.

For example, in some aspects, a process for threat detection and training of an automated threat detection system can include a first step in which a scan is run. For example, for an organization with a thousand computers, the detection rules will run on all thousand computers and collect evidence for selected events, actions, indicators, etc. These logs then can be loaded for the analyst to review. In some embodiments, a log can include a raw log, aggregated information from multiple logs, information about a file, or any other information collected from a host, system, or service. However, given the substantial volume thereof, potentially millions of logs may be available for the analyst to review. The analyst then needs to decide which logs they are actually going to review, because they can't review all of the incoming logs. The system can initiate a scan applying a selected collection of rules on one or more computing devices to collect security logs that are relevant. Such detection rules may initiate processing of the security logs by a host computer or server, and then resend the results. For example, some of the rules can be configured to scan for known types of malware, other detection rules may just collect all of the logon events for a certain time or location, etc. The analyst can create a search query or initiate the scan search to evaluate if the logs can be triaged and/or sorted to narrow them down to certain hits or particular scans that should be evaluated closer to see if there has been an attack.

In one embodiment, the analyst starts off by selecting a series of rules to run on the investigation, or the organization that's being investigated for compromise, initiating or generating the scan. A scan might be a collection of 10 rules, 20 rules, 100 rules, 1000 rules, etc. Then the scan can run on those computers of a selected set or networked group, and return the results to a central location for the analyst to review. Thus, the analyst has a collection of rule results. In some embodiments, the results can be organized by which rule they came from. For example, the analyst can be shown 20 rules results, and once accepted, one or more particular rule numbers can be selected, e.g. a rule to collect, service, and review all the various services that have been installed on a host. As the analyst is presented with more results, they may filter the results. So, they can either apply a filter, for example, they may look for a specific host, specific user name, an internal, external IP address, or they may order it based on like criteria, such as ordering the results by rarity or by whether there are any annotations. Some of the rules may return all the files that are available on a host, which files can be scanned by a collection of virus scanners, resulting in annotations such as whether there is any known malware. Alternatively, the analyst may focus on one or more of the rule results in more detail.

These rule results can be organized to enable the analyst to click on one of the rule results for more detail to make a determination of whether there is evidence of compromise and tag the result or not. If they find that it's evidence of compromise, they'll give it a malware tag. If they find that it's just a commercial software, they can apply an appropriate tag for that. In addition, if the analyst does find evidence of compromise, they may execute a pivot. For example, if the rule result relates to a particular computer, they may get more information about that computer. In other embodiments, the analyst may pivot by time, by the user name, toward a different host that was or is connected to the relevant computer, or toward other relatable results.

The system can record the analyst's actions, also described as workflow data, and these actions can be organized into playbooks or collections analyzed actions. A playbook can be made up of multiple rules, including any rules that are selected for a scan, as well as one or more pivot sequences. The playbook can include a tagging classifier trained based on the analyst's actions observed when they are tagging. In one embodiment, a developed tagging classifier can be trained with a group of labeled or tagged results using a supervised learning technique. Starting with on a binary classification that goes between malicious or not, the system can look at all the rule results that were tagged as malicious and all the rule results that were tagged as clean, and then provide the tagged rule results as the supervised learning input. If given an unknown rule result, or the rule result hasn't been tagged, the classifier can tag it automatically.

In some embodiments, the playbook can filter down the number of results an analyst looks at. This filtering can be ordered by what the analyst is most likely to click on. For example, the system can have a list of all the rule results that the analyst clicked on, and all the ones that they didn't really use, as well as a record of what filters they used. For example, if an analyst received a million results, the system can monitor what filters were applied, whether any type any regular expression was used in filtering, whether any rankings were applied, what results did the analyst pivot on, whether a pivot was by host name or username, and what pivot sequence was followed.

To execute the playbook, a scan can be run to get a set of rule results. The rule results are all the logs that come from the scan. Those rule results can be fed through a tagging classifier that exists in the playbook to give a collection of tags. The resultant tags provide a list of malicious results and a list of evidence of compromise. Another output of the playbook is the review classifier that can predict what rule results are more likely to get looked at by an analyst. For example, from a million scan results, the review classifier might provide a thousand results that are more likely to be looked at. Still another output of the playbook can be a ranking of the criteria on which the analyst might want to review the results, e.g. based on what filters and ranking methods were applied. For example, a million results can be ranked in order of predicted importance to an analyst. Still another output of the playbook can be pivot sequence, which when run on the results can provide a list of pivot chains. Thus, from the playbooks, some of the outputs or the scans are fully automated, such as processing rule results through a selected tag classifier for a collection of evidence of compromise.

In some embodiments, each of the operations described herein can be configured to run in parallel to generate a series of results that can be used to create scripts based on the learned behaviors/actions from the observed analysts, which scripts can be used and applied to future incoming security information/data/logs as part of a threat hunting playbook or set of rules to detect security threats at earlier stages.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In one embodiment, the present disclosure relates to a system for automated threat detection that learns threat hunt playbooks, or threat detection sequences, based on analyzing the behavior of human security experts during threat hunts. In some embodiments, the system can include a supervised machine learning (ML) algorithm that is trained on the behavior and workflows of trained security analysts, and which can automatically discover malicious attacks. Such threat detection systems can also increase the efficiency of analysts during threat hunts by allowing them to concentrate their time on information most likely to be associated with malicious activity, or by discovering new attack techniques or new suspicious behavior.

As used herein, a host describes one or more computers in an organization or group that is scanned as part of a threat hunt.

As used herein, a threat hunt describes a process for examination of forensic information to search for evidence of malicious attacks.

As used herein, a rule describes a detection rule that including logic or programming that can be stored and/or executed on a host machine, and which is configured to look for or identify patterns associated with potentially malicious behavior.

As used herein, a rule result describes information collected from a host machine when a detection rule finds at least one indicator of a potentially malicious activity.

As used herein, a scan describes the execution of a series of detection rules on hosts to collect information about potentially malicious activities as part of a threat hunt.

As used herein, a false positive describes a rule result from a detection rule that is determined to not be associated with malicious activity.

As used herein, a true positive describes a rule result from a detection rule that is verified to be associated with an actual instance of malicious activity.

Threat hunting is the process by which one or more security analysts review available evidence, such as security logs and the outputs of threat detection rules, to determine if, where, and how a security breach has occurred. Threat hunting often requires many hours of attention from a highly skilled security analyst. According to an embodiment of the present disclosure, an automated threat detection system can learn from a security expert's threat hunting behavior in order to automatically detect potential compromise events, and also to generate prioritized lists of potential suspicious activity in order to streamline the threat detection process.

Figure 1:
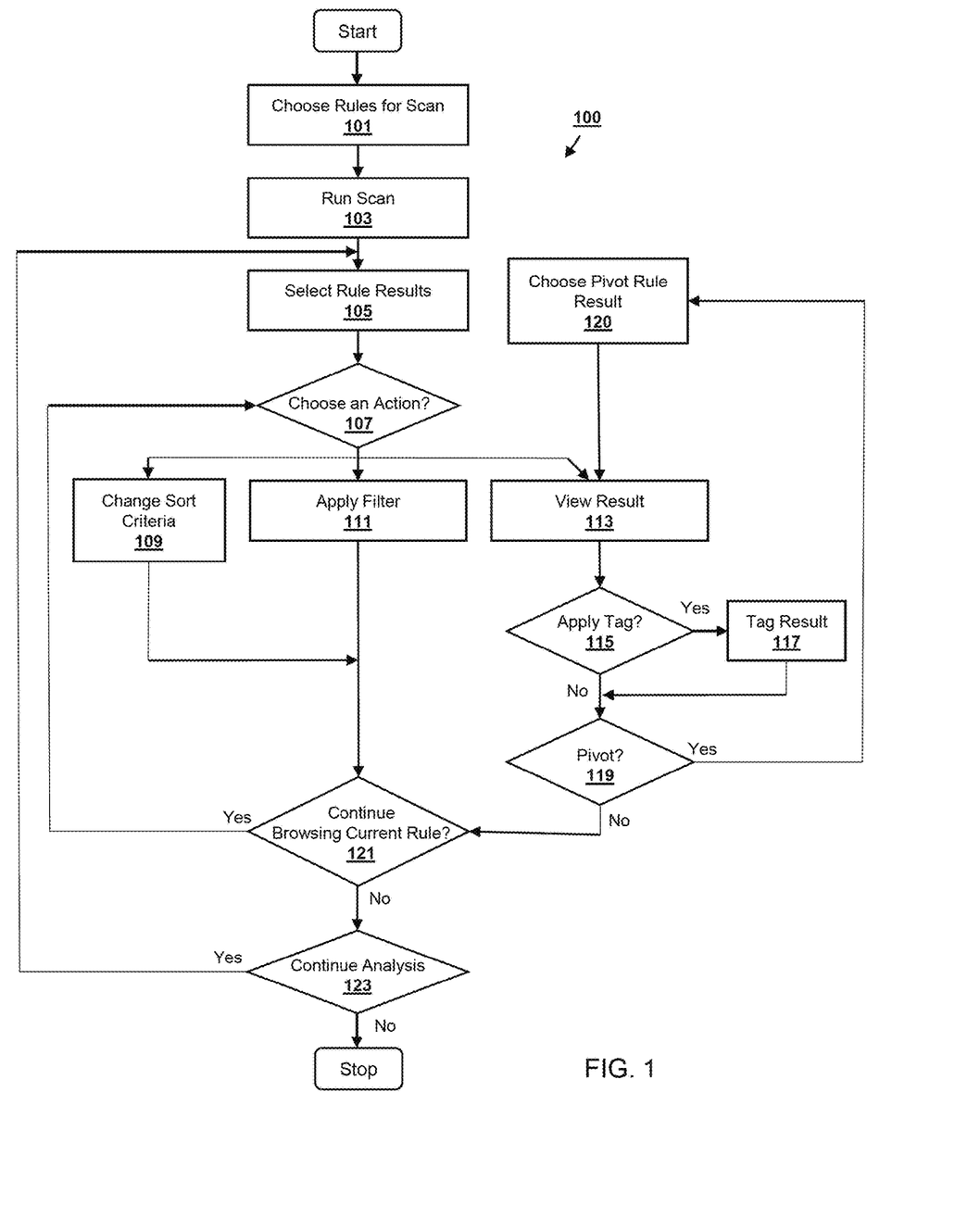
FIG. 1 is a schematic illustration of a workflow for identifying attack patterns or suspicious activity, according to one aspect of the present disclosure.

FIG. 1 shows a schematic illustration of a workflow 100 for identifying attack patterns or suspicious activity, according to one aspect of the present disclosure. According to this example, a threat hunt starts with choosing the rules for a scan 101, and running a scan 103. The detection rules can be selected to run on a host computing system and can include, for example, tactical rules designed to detect specific kinds of attacks, and strategic rules designed to pick up generalized patterns. The scan results can be uploaded to a database, in some embodiments, and then they can be evaluated by analysts conducting a threat hunt.

Not every rule result is a true positive for a malicious attack. Strategic rules may pick up a wide range of events or file artifacts, designed to find traces left behind by a malicious attack, but may also include a large number of results relating to legitimate use. For large organizations, a scan may return tens of millions of results. Searching through these results to look for attacks generally requires both time and skill.

The workflow 100 may continue at operation 105 with selecting rule results. For each rule result, there is a vector of columns, in some embodiments. The columns differ for different types of rules. For example, a rule that returns installed services may include columns such as "Service Name", "Service type, "Service Start Type", "Service Path", "Service Account", "Host Name", "IP Address", "Detection Timestamp", "Installation Timestamp", "Log", "Record Number", "Category" and "Event Description". Rule results may be annotated with additional information, such as how many times similar results have been seen before (on how many hosts and in how many organisations). If the result is from a file, it may be annotated with virus scan information. These annotations are added as additional columns appended to the rule results.

In an embodiment, threat hunting can be done on a platform designed to search, view and tag rule results. Once rule results are selected, a number of different actions can be chosen at operation 107. A non-exclusive list of the types of actions that analysts can perform on the threat hunting platform include, for example, changing sort criteria 109, applying a filter 111, and viewing a result 113. Selecting a rule can include selecting a rule to browse the returned scan results. Applying a filter can include applying a regular expression to one or more columns. Changing sort criteria can include sorting and/or ordering results based on a particular column. Viewing rule results can include viewing a result in more detail to see the original log information returned by the detection rule.

In an embodiment, upon reviewing a result at operation 113, an analyst can decide at operation 115 to apply a tag to a result to record whether that result indicates a truly malicious attack or a false positive. If a tag is to be applied, the workflow 100 can include tagging the result 117. In some embodiments, tagging schemes can be binary (e.g. "malicious" or "clean"), or list of categories, (e.g. "commercial", "potentially unwanted", "adware", "potentially malicious", "commodity malware", "APT malware"). If no tag is to be applied, or after a tag is successfully applied, the workflow 100 may continue with pivoting 119 to other results. For example, a threat hunt may pivot at operation 119 and continue to choose a pivot rule result 120, and then view rule results again at 113. In one embodiment, a threat hunt may pivot to results from other rules that have the same or similar value for a certain attribute (such as host, user, or source IP address).

The workflow 100 can continue with deciding at operation 121 whether to continue browsing the current rule results. If yes, the workflow 100 can return to choose a different action at 107. If no, the workflow 100 can continue with deciding at operation 123 whether to continue analysis. If yes, the workflow 100 can return to select different or new rule results at operation 105. If no, the workflow 100 ends.

In one embodiment, this threat hunting workflow 100 can be performed by one or more trained security analysts, and can generate workflow data that can be used to train an automated threat detection system. Workflow data can include, for example, a listing of the security log scan results selected for further analysis. Workflow data can also include types of filters, rankings, sort criteria, or tags, applied to different types of results. Workflow data can also include one or more security log items or actions associated with a pivot by one or more security analysts, as well as what pivot sequence was executed. For example, if a rule result that may be related to a compromise event relates to a particular computer, the pivot may involve getting more information about that computer. A pivot may also include recovering additional information about the time when the suspicious activity occurred, or a username or different host connected to the particular computer.

Figure 2:
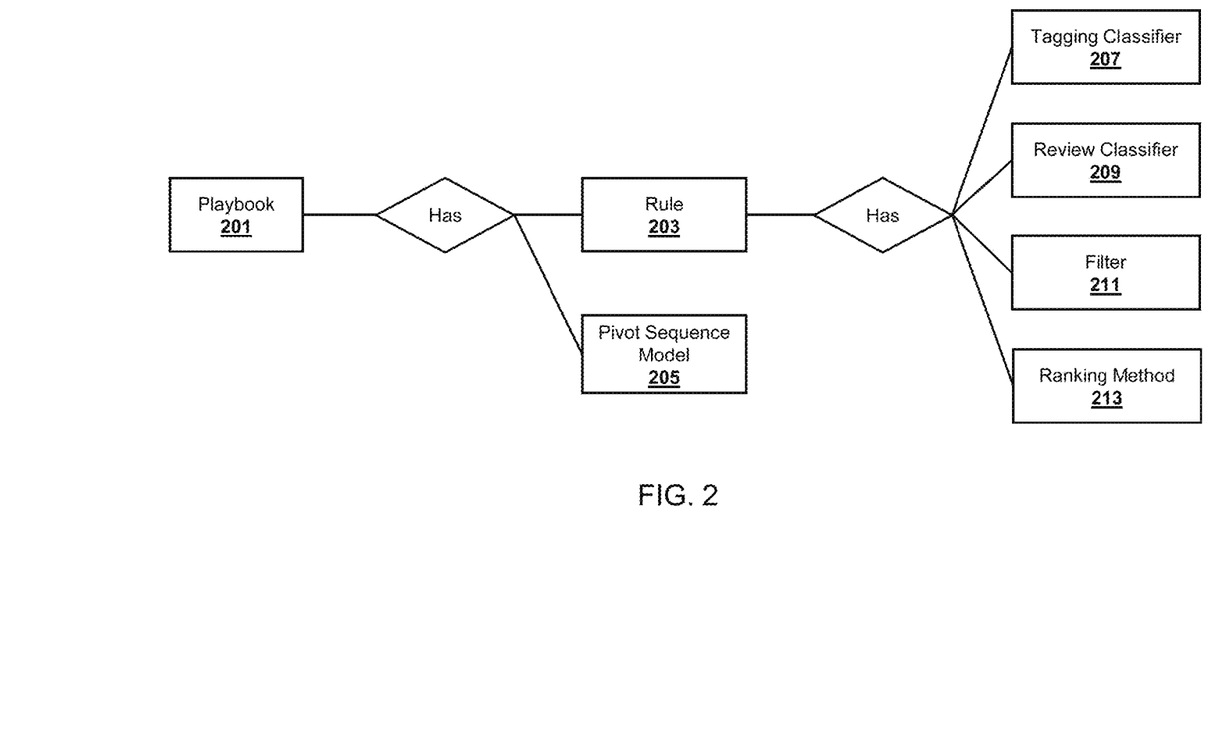
FIG. 2 is a block diagram of a method for training a threat detection system, according to one aspect of the present disclosure.

FIG. 2 is a block diagram of a method for training a threat detection system, according to one aspect of the present disclosure. In one embodiment, the threat detection system can execute an automated threat hunting playbook 201. This threat hunting playbook 201 can include a pivot sequence model 205 and rules 203, as well as a number of trained elements including a tagging classifier 207, a review classifier 209, a filter 211, and a ranking method 213, in some embodiments. This playbook 201 can be constructed or taught based on workflow data gathered by monitoring the actions of trained security analysts, such as the actions described above in reference to FIG. 1.

According to the embodiment shown in FIG. 2, an automated threat hunting playbook 201 includes rule sets 203, tagging classifiers 207, review classifiers 209, filters 211, ranking methods 213, and a pivot sequence model 205.

The rule sets 203 can include a collection of detection rules to be run in a scan. In one embodiment, clustering algorithms may be applied to get the rule sets that security analysts select on threat hunts. In this way, sets of rules can be automatically maintained based on the workflow data discussed above.

The tagging classifiers 207 can include classifiers that analyze the rule results and automatically tag whether the result is malicious (a true positive) or a false positive. Each rule can have one associated tagging classifier. In one embodiment, for each rule, a set of tagging results can be used to train an automated tagging classifier 207. This may be achieve using, for example, a supervised ML algorithm. The rule column values, plus the annotation columns, can be used as the input feature vector for such an algorithm. The tags can be used as the class label. Example classification algorithms that may be used include, but are not limited to: instance based classifiers, decision trees, decision forests, support vector machines, or neural networks. To ensure that classifiers are not over-fitted, they may be trained on data obtained from multiple organizations, in some embodiments. In some embodiments, the tags can be indicators of compromise within a computer network.

The review classifiers 207 can include classifiers that filter the rule results to recommend a subset of results that should be manually reviewed by a security analyst. Each rule can have one associated review classifier. In some embodiments, for each rule a review classifier 209 can be trained to automatically identify results that are of high interest to analysts and which should be reviewed manually. Since analysts only have time to view a small subset of the entire set of rule results, the recorded logs of which results were viewed by analysts can be used as the training set for the review classifier 209. In one embodiment, the feature vector for the training set can be the rule column data and annotations. The class label can be binary, denoting whether the result was viewed or not viewed by an analyst. Any class based supervised learning algorithm can be used to train the review classifier 209, such as those algorithms listed above in reference to training the tagging classifier 207.

The filters 211 can include filters that are automatically applied to the rule results to reduce the set of results to be reviewed. A rule may have zero or multiple filters, in various embodiments. Multiple filters can be applied in an AND combination (where only results that satisfy all filters are retained) or an OR combination (where results that satisfy any filter are retained). The ranking methods 213 can include the order in which rule results should be viewed in order from results of highest priority to lowest priority. Each rule can have one associated ranking method. In one embodiment, the filters and ranking methods can be associated with rules using the recorded filters and sorting methods and columns from the workflow data of security analysts as a training set.

The pivot sequence model 205 can include an automated sequence of results to be viewed tracing a possible attack. In one embodiment, a pivot sequence model can be constructed and trained using the actions of analysts in threat hunting as a training set. A pivot sequence can include a series of actions taken in investigating a potential compromise event, as recorded in the workflow data discussed above.

Figure 3:
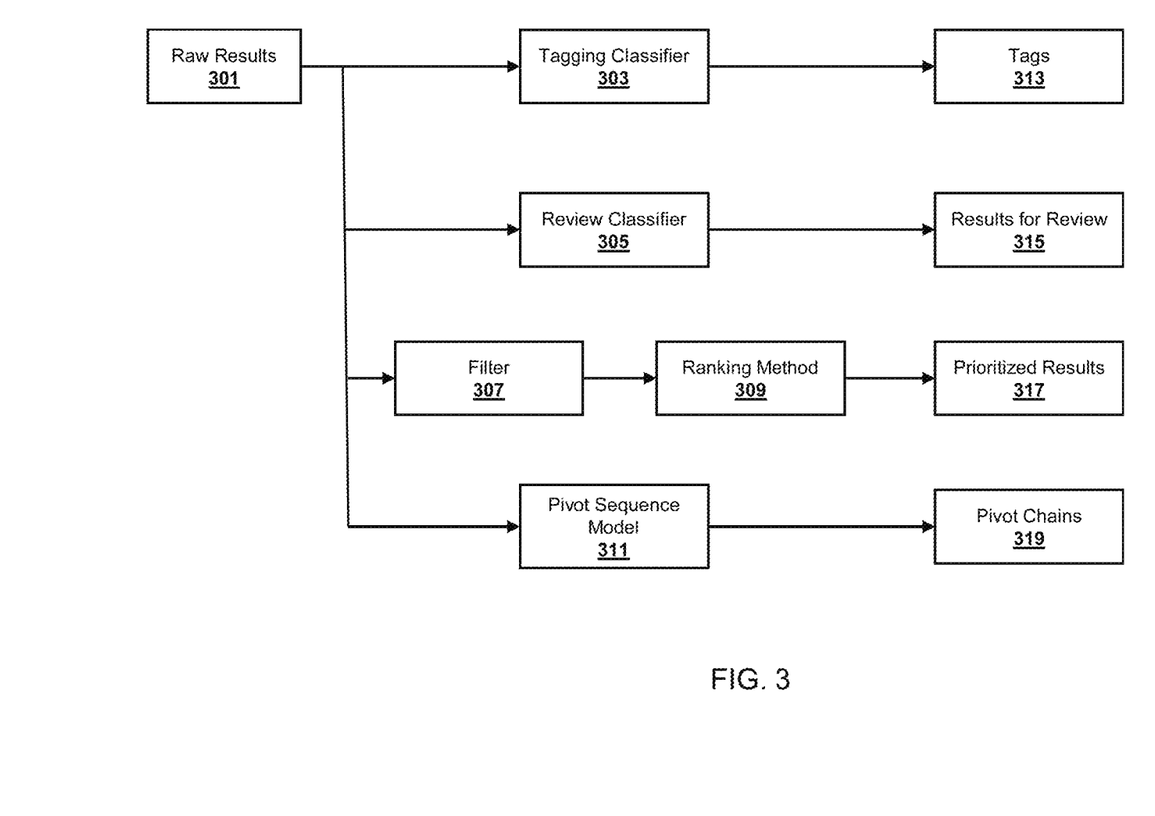
FIG. 3 is a block diagram of a method of applying a threat detection system to raw scan results, according to one aspect of the present disclosure.

FIG. 3 is a block diagram of a method of applying a threat detection system to raw scan results, according to one aspect of the present disclosure. In this embodiment, the raw scan results 301 can be applied to a trained tagging classifier 303, review classier 305, filter 307 and ranking method 309, and pivot sequence model 311. The tagging classifier 303, review classier 305, filter 307 and ranking method 309, and pivot sequence model 311 can be trained as discussed above in reference to FIG. 2 using one or more ML algorithms, and based on the recorded actions and workflow data of trained security analysts. The outputs of the threat detection system can include, for example, automated tags 313, results for manual review 315, prioritized results 317, and pivot chains 319.

In one embodiment, executing the automated threat detection system can include inputting the raw results 301 (i.e. results from the scan 103 described in reference to FIG. 1) into the trained tagging classifier 303 to generate automated tags 313. These automated tags 313 can be automatically generated according to an assigned maliciousness level using the tagging classifier 303. In one embodiment, the tagging classifier might review 10 million results and might automatically generate 20 malicious tags. In such an example, this provides a limited number of potential compromise events from the 10 million results reviewed.

In one embodiment, executing the automated threat detection system can also include inputting the raw results 301 into a review classifier 305 to generate a selection of results for review 315. These results can be a subset of the full scan results, and can include a series of results that should be manually reviewed by a security analyst, as these results are more likely to be related to a malicious attack. In one embodiment, the review classifier may automatically analyze 10 million results and provide a list of 10 thousand results that are selected for further manual review. In such an example, these 10 thousand results are the ones that the review classifier 305 predicts are the most important for an analyst to review.

In one embodiment, executing the automated threat detection system can also include inputting the raw results 301 into a filter 307 and ranking method 309 to generate a list of prioritized results 317. In some embodiments, this list of prioritized results 317 can include the full set of scan results that are filtered and ranked, should a security analyst wish to inspect the results manually.

In one embodiment, executing the automated threat detection system can also include inputting the raw results 301 into a pivot sequence model 311 to generate pivot chains. The pivot chains 319 can include a series of rule results that trace a potential attack. In some embodiments, these results may be used for automated resolutions, or be reviewed manually by a security analyst.

As discussed herein, the recorded actions of analysts can be used as a basis for creating automated threat hunt scripts and training the various models and classifiers. In some embodiments, each of these processes described in FIG. 3 can be running in parallel to generate the tags 313, results for manual review 315, prioritized results 317, and pivot chains 319.

Figure 4:
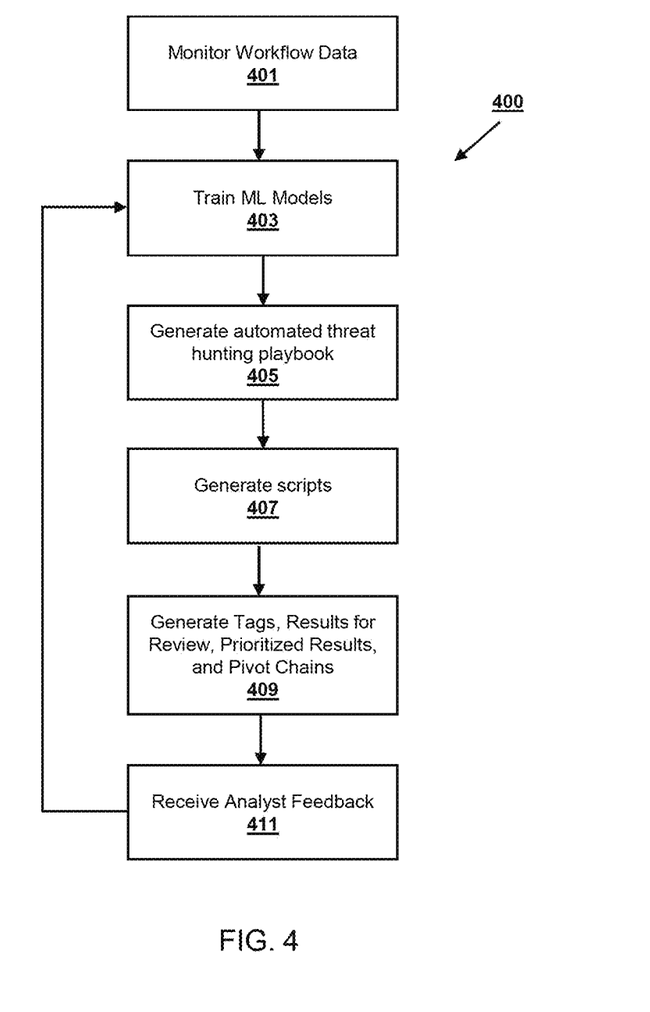
FIG. 4 is a schematic illustration of a workflow for dynamically training a threat detection system, according to one aspect of the present disclosure.

FIG. 4 is a schematic illustration of a workflow 400 for dynamically training a threat detection system, according to one aspect of the present disclosure. In some embodiments, the accuracy of the automated threat detection system can be continuously improved by retraining the models according to how analysts review and correct the results.

In one embodiment, the workflow 400 begins with monitoring workflow data 401. As discussed above, workflow data can include, for example, a listing of the security log scan results selected for further analysis. Workflow data can also include types of filters, rankings, sort criteria, or tags applied to different types of results. Workflow data can also include one or more security log items or pivot chains associated with a pivot by security analysts, as well as actions executed by security analysts. In some embodiments, a pivot chain includes a series of rule results that trace a potential attack.

This workflow data can then be used to train the ML models 403 discussed above, including the tagging classifier, review classifier, filter and ranking methods, and pivot sequence model. The training of these ML models is discussed in more detail in reference to FIG. 2.

Once the models have been trained at 403, the automated threat hunting playbook can be generated at 405, including the tagging classifier, the review classifier, and the filter and ranking method. The playbook can also include a pivot sequence model, as discussed above.

The workflow 400 continues at 407 with generating one or more scripts for automatically analyzing incoming security data using the automated threat hunting playbook. Once the playbook has been generated, the trained models within the playbook can be applied to raw scan data at 409 to generate tags, a selection of results for review, prioritized results, and/or pivot chains. These operations, and the generation of the outputs of the ML models, are discussed in detail in reference to FIG. 3.

The workflow 400 continues at 411 with receiving analyst feedback on the outputs of the ML models generated at 409. In some embodiments, the analyst feedback can include edits or changes to automated tags generated by the tagging classifier. For example, when an analyst corrects a tag, or finds other results to assign tags, this information can be used to further train the tagging classifier.

The analyst feedback can also include a list of the actual results reviewed by the analyst from the results for review generated by the review classifier. For example, if the review classifier generated a focused or curated list of two thousand results for review, and the analyst only reviewed a subset of 800 results, this information can be stored for further training of the review classifier.

In some embodiments, the analyst feedback can include a list of the results reviewed by the analyst from the prioritized results generated by the filter and ranking methods. For example, if the filter and ranking methods organized results in a particular ranking, or applied a particular filter, and the analyst reviewed the results in a different order than the automatically-generated ranking, this information can be stored for further training of the filter and ranking methods.

In some embodiments, the analyst feedback can include an alternative pivot sequence executed by the analyst that is different from the pivot chain generated by the pivot sequence model. If the analyst executed a different pivot than the one recommended by the pivot sequence model, this can be used as an additional input for further training of the pivot sequence model.

The workflow can continue by applying the analyst feedback to the training of the ML methods at 403 in order to dynamically update the models and increase the accuracy of the automated threat detection system.

For purposes of this disclosure, an information handling system 80 (FIG. 5) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

Figure 5:
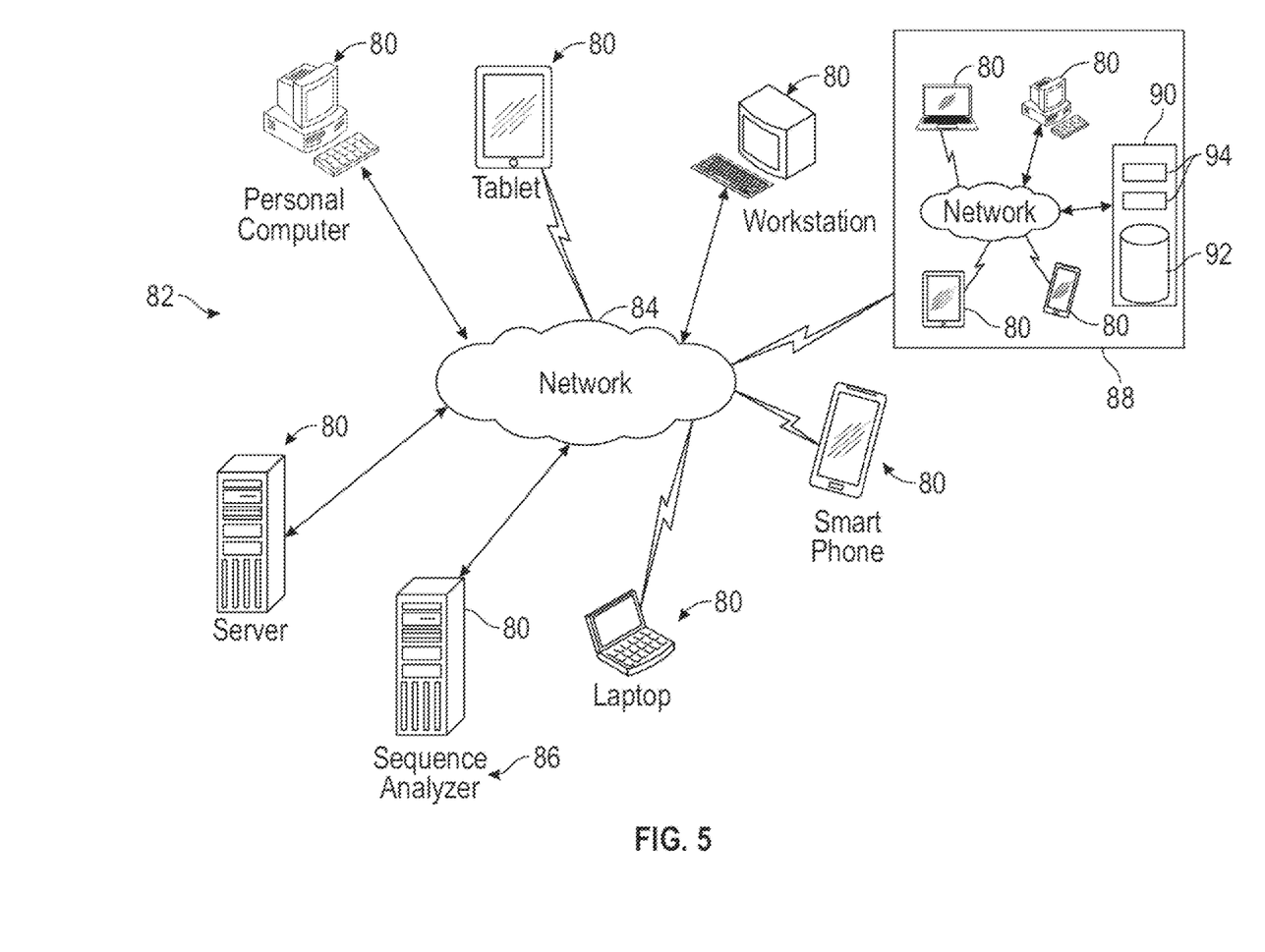
FIG. 5 is a schematic illustration of a networked system of information handling systems, according to one example of the present disclosure.

As shown in FIG. 5, in some embodiments, the clients 12 can manage or otherwise include one or more networked system 82 of information handling systems/devices 80 or other communicable systems/devices. A network 84 may provide data communications among the information handling systems/devices 80, which can include workstations, personal computers, smart cellular telephones, personal digital assistants, laptop computers, servers, and other suitable devices. The network 84 can include a private or public network, such as a local area network, or other suitable network(s), such as the Internet or another wide area network, virtual personal network, peer to peer filing sharing system, and/or other suitable communication lines, or combinations thereof. FIG. 5 also indicates that the linked or networked information handling systems 80 may include one or more monitoring devices 86 communicatively coupled to the network 84. The monitoring device(s) 86 can be managed by a managed security service provider (MSSP).

In one embodiment, the monitoring device(s) 86 may include a server or sequence analyzer or other client suitable computing device that has a processor and a memory or other suitable storage. The memory can include a random access memory (RAM), read only memory (ROM), and/or other non-transitory computer readable medium. The monitoring device(s) 86 further typically will be operable to store and execute computer readable instructions to continuously monitor, in real-time, activity at each networked system, for example, activity of the information handling systems 80 connected to network 84. The monitoring device(s) 86 can ingest or aggregate information or data logs related to activities of the information handling systems 80 and can provide these ingested/aggregate data logs or information or data related thereto to by the automated threat detection system described herein. In addition, or in the alternative, the automated threat detection system described herein can include a data center 88, such as a data center 88 management by an MSSP, with a plurality of networked information handling systems 80, e.g., including one or more servers 90 with at least one memory 92 and one or more processors 94 for receiving information or data logs related to activities of the information handling systems 80 of system 82. These information/data logs can be a part of the raw logs 14 provided to the automated threat detection system described herein.

One or more components of the systems described herein can be resident on or accessed by the devices 80, the server(s) 90, or other devices or information handling systems in communication therewith. One or more processors of the device 80 of the one or more processors 94 can process or execute instructions, workflows, etc., stored in at least one memory (e.g., a memory of the devices 90 or memory 92) to facilitate performance of various processes, functions, etc. of the automated threat detection system described herein.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for dynamically training a security threat detection system, comprising:
    monitoring security analyst workflow data from one or more security analysts analyzing scans of security logs, wherein the workflow data includes one or more rules applied to security log scan results, rule results selected for further analysis, tags applied to rule results, filters applied to rule results, rankings applied to rule results, or one or more actions associated with a pivot by the one or more security analysts, and/or combinations thereof;
    training a tagging classifier based on the tags assigned to rule results from the workflow data;
    training a review classifier based on the rule results selected for further analysis;
    training a filter and ranking method based on filters and rankings applied to rule results from one or more security analysts;
    training a pivot sequence model based on actions executed by the one or more security analysts;
    generating an automated threat hunting playbook including the tagging classifier, the review classifier, the pivot sequence model, and the filter and ranking method; and
    generating one or more scripts for automatically analyzing incoming security data using the automated threat hunting playbook.

2. The method of claim 1, wherein the tagging classifier, review classifier, filter and ranking method, and pivot sequence model comprise supervised machine learning models trained based on the workflow data of one or more security analysts.

3. The method of claim 2, wherein the one or more scripts for automatically analyzing incoming security data generate a plurality of tags, wherein each tag comprises an indicator of compromise within a computer network.

4. The method of claim 3, further comprising:
receiving a tag update from one or more security analysts; and
dynamically updating the tagging classifier based on the tag update.

5. The method of claim 2, wherein the one or more scripts for automatically analyzing incoming security data generate a selection of results for review.

6. The method of claim 5, further comprising:
receiving analyst feedback regarding the selection of results for review; and
dynamically updating the review classifier based on the analyst feedback regarding the selection of results for review.

7. The method of claim 2, wherein the one or more scripts for automatically analyzing incoming security data generate a selection of prioritized results.

8. The method of claim 7, further comprising:
receiving analyst feedback regarding the selection of prioritized results; and
dynamically updating the filter and ranking method based on the analyst feedback regarding the selection of prioritized results.

9. The method of claim 1, wherein the one or more scripts for automatically analyzing incoming security data generate one or more pivot chains via the pivot sequence model, wherein a pivot chain comprises a series of rule results that trace a potential attack.

10. The method of claim 9, further comprising:
receiving pivot chain feedback from one or more security analysts; and
dynamically updating the pivot sequence model based on the pivot chain feedback.

11. A dynamically trained threat detection system, comprising:
one or more computing systems configured to monitor and store security analyst workflow data from one or more security analysts analyzing scans of security logs, wherein the workflow data includes rules applied to security log scan results, rule results selected for further analysis, tags applied to rule results, filters applied to rule results, rankings applied to rule results, or one or more actions associated with a pivot by the one or more security analysts, and/or combinations thereof;
a tagging classifier trained based on the tags assigned to rule results from the workflow data;
a review classifier trained based on the rule results selected for further analysis;
a pivot sequence model trained based on actions executed by one or more security analysts;
a filter and ranking method trained based on the filters and rankings applied to rule results from one or more security analysts; and
an automated threat hunting playbook including the tagging classifier, the review classifier, the pivot sequence model, and the filter and ranking method, wherein the automated threat hunting playbook is configured to generate one or more scripts for automatically analyzing incoming security data.

12. The system of claim 11,
wherein the pivot sequence model generates a pivot chain, and wherein the pivot chain comprises a series of rule results that trace a potential attack.

13. The system of claim 12, wherein the tagging classifier, review classifier, filter and ranking method, and pivot sequence model comprise supervised machine learning models trained based on the workflow data of one or more security analysts.

14. The system of claim 11, wherein the pivot sequence model, when applied to raw scan data from a security log, is configured to generate one or more pivot chains.

15. The system of claim 11, wherein the tagging classifier, when applied to raw scan data from a security log, is configured to generate a plurality of tags, each tag being an indicator of compromise within a computer network.

16. The system of claim 11, wherein the review classifier, when applied to raw scan data from a security log, is configured to generate a selection of results for review.

17. The system of claim 11, wherein the filter and ranking method, when applied to raw scan data from a security log, is configured to generate a selection of prioritized results.

18. A system for dynamically training a security threat detection system, comprising:
one or more processors and at least one memory having stored therein instructions that when executed by the one or more processors, cause the system to:
monitor and record workflow data from one or more security analysts analyzing security logs within a computer network, wherein the workflow data includes rules applied to security log scan results, rule results selected for further analysis, tags applied to rule results, filters applied to rule results, rankings applied to rule results, or one or more actions associated with a pivot by the one or more security analysts, and/or combinations thereof;
train a tagging classifier based on the tags applied to rule results from the workflow data;
train a review classifier based on the rule results selected for further analysis by one or more security analysts;
train a filter and ranking method based on the filters and rankings applied to rule results from one or more security analysts;
train a pivot sequence model based on actions executed by one or more security analysts during a threat hunt, the pivot sequence model to generate one or more pivot chains, wherein the tagging classifier, review classifier, filter and ranking method, and pivot sequence model are each supervised machine learning models trained based on the workflow data of one or more security analysts; and
generate an automated threat hunting playbook including the tagging classifier, the review classifier, pivot sequence model, and the filter and ranking method.

19. The system of claim 18, wherein the instructions further cause the system to:
analyze incoming security data using the threat hunting playbook to generate a plurality of tags, a selection of results for review, a selection of prioritized results, and one or more pivot chains, wherein each tag is an indicator of compromise within a computer network, and a pivot chain is a series of rule results that trace a potential attack;
receive analyst feedback regarding the plurality of tags, the selection of results for review, the selection of prioritized results, and the one or more pivot chains; and
dynamically update the tagging classifier, review classifier, filter and ranking method, and pivot sequence model based on the analyst feedback.

20. The system of claim 19, wherein analyst feedback includes an alternative pivot sequence executed by the analyst that is different from a pivot chain generated by the pivot sequence model.

21. The system of claim 18, wherein the pivot by the one or more security analysts comprises one or more of a pivot by time, by user name, towards a different host connected to a computer at a specified time, based on a pivot sequence that was followed, or toward relatable results.

22. The system of claim 21, wherein the pivot sequence includes include a series of actions taken in investigating a potential compromise event.

23. The system of claim 18, wherein the threat hunt includes a process for examination of forensic information to search for evidence of malicious attacks.

* * * * *